(12) United States Patent
Jiang

(10) Patent No.: US 12,151,420 B2
(45) Date of Patent: Nov. 26, 2024

(54) BLOW-MOLDED PANEL AND MANUFACTURING METHOD FOR BLOW-MOLDED PANEL

(71) Applicant: Jinglei Jiang, Yuyao (CN)

(72) Inventor: Jinglei Jiang, Yuyao (CN)

( * ) Notice: Subject to any disclaimer, the term of this patent is extended or adjusted under 35 U.S.C. 154(b) by 302 days.

(21) Appl. No.: 17/630,161

(22) PCT Filed: Jul. 27, 2020

(86) PCT No.: PCT/CN2020/104794
§ 371 (c)(1),
(2) Date: Jan. 28, 2022

(87) PCT Pub. No.: WO2021/013264
PCT Pub. Date: Jan. 28, 2021

(65) Prior Publication Data
US 2022/0288835 A1 Sep. 15, 2022

(30) Foreign Application Priority Data

Jul. 25, 2019 (CN) .................. 201910678593.X
Jul. 22, 2020 (CN) .................. 202010711157.0
Jul. 22, 2020 (CN) .................. 202021464842.X

(51) Int. Cl.
*B29C 49/22* (2006.01)
*B29C 49/00* (2006.01)
(Continued)

(52) U.S. Cl.
CPC .......... *B29C 49/22* (2013.01); *B29C 49/0005* (2013.01); *B29C 49/04116* (2022.05); *B29C 49/20* (2013.01); *B29C 2049/2013* (2013.01); *B29K 2023/065* (2013.01); *B29K 2105/0088* (2013.01); *B29K 2105/26* (2013.01); *B29K 2309/08* (2013.01); *B29K 2995/0091* (2013.01);
(Continued)

(58) Field of Classification Search
CPC . B29C 49/0411; B29C 49/0005; B29C 49/22; B29L 2007/00; B29K 2995/00; B29K 2309/08
See application file for complete search history.

(56) References Cited

U.S. PATENT DOCUMENTS 5,714,227 A * 2/1998 Sugawara ............... B29C 49/04
428/161
2016/0270521 A1 * 9/2016 Jiang ...................... A47B 13/08

FOREIGN PATENT DOCUMENTS

CN  1508000 A  *  6/2004
JP  2521035 Y2 * 10/1996
(Continued)

OTHER PUBLICATIONS

Rosato et al, Blow Molding Handbook. 1989, p. 467. (Year: 1989).*
(Continued)

*Primary Examiner* — Robert B Davis
(74) *Attorney, Agent, or Firm* — Raymond Y Chan; David & Raymond Patent Firm

(57) ABSTRACT

A manufacturing method for a blow-molded panel and a blow molding equipment are provided. The blow-molded panel is a double-layer structure or a multilayer structure and is formed by means of blow molding, wherein respective layers thereof can be made of different materials so that the blow-molded panel has relative good performance.

12 Claims, 7 Drawing Sheets

(51) Int. Cl.
  *B29C 49/04* (2006.01)
  *B29C 49/20* (2006.01)
  *B29K 23/00* (2006.01)
  *B29K 105/00* (2006.01)
  *B29K 105/26* (2006.01)
  *B29K 309/08* (2006.01)
  *B29L 7/00* (2006.01)

(52) U.S. Cl.
  CPC . *B29K 2995/0097* (2013.01); *B29L 2007/002* (2013.01)

(56) References Cited

FOREIGN PATENT DOCUMENTS

| | | | | |
|---|---|---|---|---|
| JP | 3802983 B2 * | 8/2006 | ............. | B29C 44/04 |
| WO | WO-2019067654 A1 * | 4/2019 | ........... | B29C 43/203 |

OTHER PUBLICATIONS

Machine translation of Chen et al (CN 1508000-A), dated 2004. (Year: 2004).*

Machine translation of JP 2521035 Y2 dated Oct. 1996. (Year: 1996).*

Machine translation of Fukushima et al (JP 3802983 B2) dated May 2006. (Year: 2006).*

\* cited by examiner

BLOW-MOLDED PANEL AND MANUFACTURING METHOD FOR BLOW-MOLDED PANEL

BACKGROUND OF THE PRESENT INVENTION

Field of Invention

The present invention relates to a panel manufacturing technologies, and more particularly to a blow-molded panel and manufacturing method thereof.

Description of Related Arts

Panels are commonly used in our daily products, especially plastic panels. Plastic panels have advantages in low production costs, good acid and alkali's resistant, and oil resistant, such that plastic panels have better capabilities comparing with the panels made of other materials. However, one of the drawbacks of the plastic panels is that the plastic panels are not scratch resistant, wherein scratches are commonly formed on the plastic panels during the transportation or in use. The scratches will devalue the plastic panels and reduce the aesthetic appearance of the plastic panels. In addition, the structural strength of the plastic panel is relatively weak, wherein the plastic panel is difficult to support heavier objects on its supporting surface. In other words, the supporting surface of the plastic panel will be collapsed or damaged after a period of use time. Furthermore, the impact resistance of the plastic panel is weak, such that it is easy to break especially when it is dropped from an elevated position.

On the other hand, the panel made of metal or wood has a stronger load-bearing capacity, wherein its supporting surface can be treated to have better scratch resistance. However, the manufacturing cost and transpiration cost of these metal or wood panels are relatively high comparing to these of the plastic panels. The shape and size of the plastic panels can be easily altered and modified because the plastic panels can be molded into different shapes according to the actual use of the panel during the manufacturing process.

Therefore, the plastic panels are still being commonly used due to the excellent capabilities, and are continuously improved to have better scratch resistance, higher strength and/or better impact resistance. Through the continuation of the related experiments, researchers continuously improve the abilities of the plastic panels by adding different additives into the plastic materials. For example, reinforcing agents are added into the plastic materials, such that the plastic panels can have better capacities. Accordingly, it will take longer time for research and development of the raw materials of the plastic panels for mass production thereof while it will highly increase its manufacturing costs of the plastic panels.

SUMMARY OF THE PRESENT INVENTION

In order to solve the above mentioned technical problems of the existing plastic panels, the present invention provides a technical solution for a blow-molded panel with better impact resistance, light weight, and rigid structure.

Another advantage of the invention is to provide a blow-molded panel, which is constructed to have a double-layer panel structure having a better impact resistance, rigid structure and light weight.

Another advantage of the invention is to provide a blow-molded panel, which is constructed to have a triple-layer panel structure having a better impact resistance, rigid structure and light weight.

According to the present invention, the foregoing and other objects and advantages are attained by a blow-molded panel, comprising an upper panel member and a lower panel member, wherein the upper panel member and the lower panel member are spaced part with each other to form a hollow structure, wherein each of the upper panel member and the lower panel member comprises an outer layer and an inner layer, wherein a portion of the lower panel member is recessed in a direction toward the upper panel until the inner layer of the lower panel member is fused with the inner layer of the upper panel member to form a plurality of supporting structure.

Preferably, each of the upper panel member and the lower panel member comprises an outer layer, an intermediate layer and an inner layer, wherein a portion of the lower panel member is recessed in a direction toward the upper panel until the inner layer of the lower panel member is fused with the inner layer of the upper panel member to form a plurality of supporting structure.

In order to improve the strength of an edge structure of the blow-molded panel, the upper panel member has an outer bending wall downwardly bent from an outer edge thereof, and the lower panel member has an inner bending wall downwardly bent from an outer edge thereof, wherein a bottom of the inner layer of the outer bending wall and a bottom of the inner layer of the inner bending wall are integrated with each other.

In order to improve the structural strength of the blow-molded panel, the supporting structure can be embodied as a point structure or an elongated strip structure.

Preferably, at least one reinforcing rib is provided at the supporting structure.

Preferably, the contacting supporting structure is constructed to have two reinforcing ribs and three corresponding peak points, wherein the reinforcing ribs and the peak points are arranged in alternating manner.

According to the preferred embodiment, each panel member of the blow-molded panel of the present invention has a double-layer structure, wherein the outer layer of each of the upper and lower panel members is made of high density polyethylene, and the inner layer of each of the upper and lower panel members is made of a mixture of high density polyethylene, metallocene polyethylene and calcium carbonate, or a mixture of high-density polyethylene, metallocene polyethylene and glass fiber.

Preferably, for the inner layer, the mass percentage of the metallocene polyethylene is 10-15%, the mass percentage of the calcium carbonate is 15-20%, and the rest is high density polyethylene. Alternatively, the mass percentage of the metallocene polyethylene is 10-15%, the mass percentage of the glass fiber is 15-25%, and the rest is high density polyethylene.

According to the double panel members with triple layer configuration of the blow-molded panel, the outer layer of each of the upper panel member and the lower panel member is made of high density polyethylene, and the intermediate layer of each of the upper panel member and the lower panel member is made of a mixture of high density polyethylene and calcium carbonate or a mixture of high density polyethylene and glass fiber, and the inner layer of each of the upper panel member and the lower panel member is made of metallocene polyethylene.

According to one embodiment, for the intermediate layer, the mass percentage of high density polyethylene is 70-85%, and the mass percentage of calcium carbonate is 15-30%.

According to another embodiment, for the intermediate layer, the mass percentage of the high density polyethylene is 60-85%, and the mass percentage of the glass fiber is 15-40%.

Compared with the prior art, the advantage of the present invention is that the blow-molded panel is constructed to have the upper and lower panel members to form a hollow structure, so as to provide a lightweight, rigid, and impact-resistant panel structure. At least a portion of the lower panel member is stretched and recessed in the direction toward the upper panel member until the inner layer of the lower panel member and the inner layer of the upper panel member are fused with each other to form a plurality of supporting structures distributed evenly to improve the structural strength of the blow-molded panel. The outer layer can be made of materials with high surface strength, scratch resistance, and oil resistance. The inner layer can be made of materials with low thermoplastic shrinkage ratio to provide frame support. When adding the intermediate layer which is made of high rigidity, a predetermined elasticity and energy absorption material, the intermediate layer is able to provide a buffering effect to minimize the damage to the panel due to impact and drop and to further improve the overall structural strength of the blow-molded panel.

Another advantage of the invention is to provide a blow-molded panel and its manufacturing method thereof, wherein the blow-molded panel is prepared by a blow molding process, and the manufacturing method is simple and the performance is excellent.

Another advantage of the invention is to provide a blow-molded panel and its manufacturing method thereof, wherein the blow-molded panel has better scratch resistance.

Another advantage of the invention is to provide a blow-molded panel and its manufacturing method thereof, wherein the blow-molded panel has better structural strength.

Another advantage of the invention is to provide a blow-molded panel and its manufacturing method thereof, wherein the blow-molded panel has better impact resistance.

Another advantage of the invention is to provide a blow-molded panel and its manufacturing method thereof, wherein at least a portion of the blow-molded panel can be made of recycled plastic, and the surface color of the blow-molded panel can be selected in different colors according to the requirement and actual need.

Another advantage of the invention is to provide a blow-molded panel and its manufacturing method thereof, wherein the blow-molded panel is constructed to have a hollow structure that the first panel member and second panel member are spaced apart from each other to achieve a lightweight feature and to enhance the structural strength.

Another advantage of the invention is to provide a blow-molded panel and its manufacturing method thereof, wherein the blow-molded panel is constructed to have the first panel member and second panel member each being configured to have two or more layer structure, wherein different layers are made of different materials to provide different performances so as to enhance the overall performance of the blow-molded panel.

In accordance with another aspect of the invention, the present invention comprises a method of manufacturing a blow-molded panel, which comprises the steps of:

heating a first polymer and a second polymer to make the first polymer and the second polymer in a fluid state;

extruding the first polymer and the second polymer to form a first polymer layer and a second polymer layer fused with each other to obtain a fused body, wherein the first polymer layer is located at an outer side of the second polymer layer and the first polymer layer and the second polymer layer are fused to each other; and forming a blow-molded panel by the fused body in a molding die, wherein the fused body is air-blown for being shaped that at least a portion of the fused body is biased against an inner wall of the molding die to form a first panel member while and another portion of the fused body is biased against the inner wall of the molding die to form a second panel member so as to form a cavity between the first panel member and the second panel member, wherein the second panel member is constructed to have at least one of a portion of the first polymer and a portion of the second polymer, wherein the first panel member is constructed to have at least one of another portion of the first polymer and another portion of the second polymer, wherein at least a portion of said second panel member is stretched in the molding die to be recessed into the cavity so as to form at least one supporting structure, wherein the first panel member is supported by the supporting structure formed by the second panel member.

According to the preferred embodiment, the method further comprises a step of:

heating a third polymer to make the third polymer in a fluid state, wherein the third polymer is extruded to form a third polymer layer fused with an inner side of the second polymer layer, wherein the first panel member is constructed to have at least one of a portion of the first polymer, a portion of the second polymer, and a portion of the third polymer, wherein the second panel member is constructed to have at least one of another portion of the first polymer, another portion of the second polymer, and another portion of the third polymer.

According to the preferred embodiment, the method further comprises a step of:

blow-molding the second panel member in the molding die to form at least one peak point extending into the cavity, wherein the peak point is recessed toward the first panel member and is connected with the first panel member.

According to the preferred embodiment, the portion of the second panel member is stretched and recessed toward the first panel member until the second polymer layer of the second panel member is fused with the second polymer layer of the first panel member to form the peak point.

According to the preferred embodiment, the method further comprises a step of:

two or more different portions of the second panel member being stretched at the same time in the molding die to be recessed into the cavity to form two or more of the supporting structures being distributed at the second panel member, wherein each of the supporting structures forms a recess cavity.

According to the preferred embodiment, the fused body corresponding to the second panel member is stretched and recessed in the molding die toward the cavity to form the supporting structure and is protruded outwardly to form at least one reinforcing rib, wherein the reinforcing rib is located in the recessed cavity and is integrally extended to the supporting structure.

According to the preferred embodiment, the reinforcing rib is defined at a portion of the supporting structure which is protruded toward the first panel member and is formed in a U-shaped wave form, wherein the reinforcing rib is extended along a bottom of the recessed cavity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "interior" and "exterior" and in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

The present invention will be further described in detail below with reference to the embodiments of the drawings.

Embodiment 1

Figure 1:
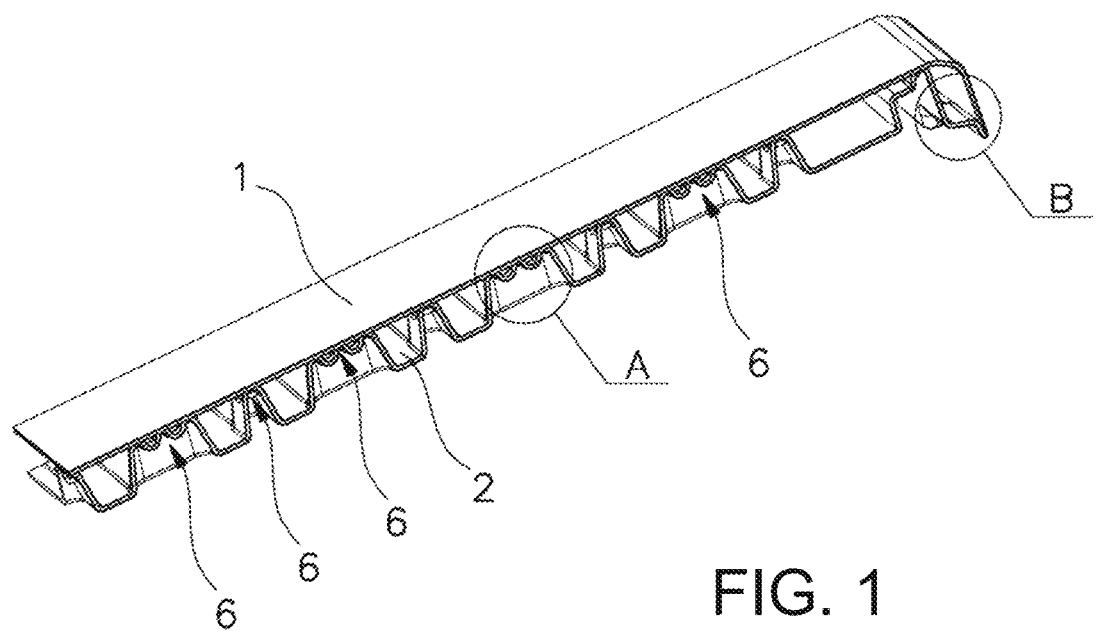
FIG. 1 is a sectional perspective view of a blow-molded panel according to a first preferred embodiment of the present invention.
Figure 2:
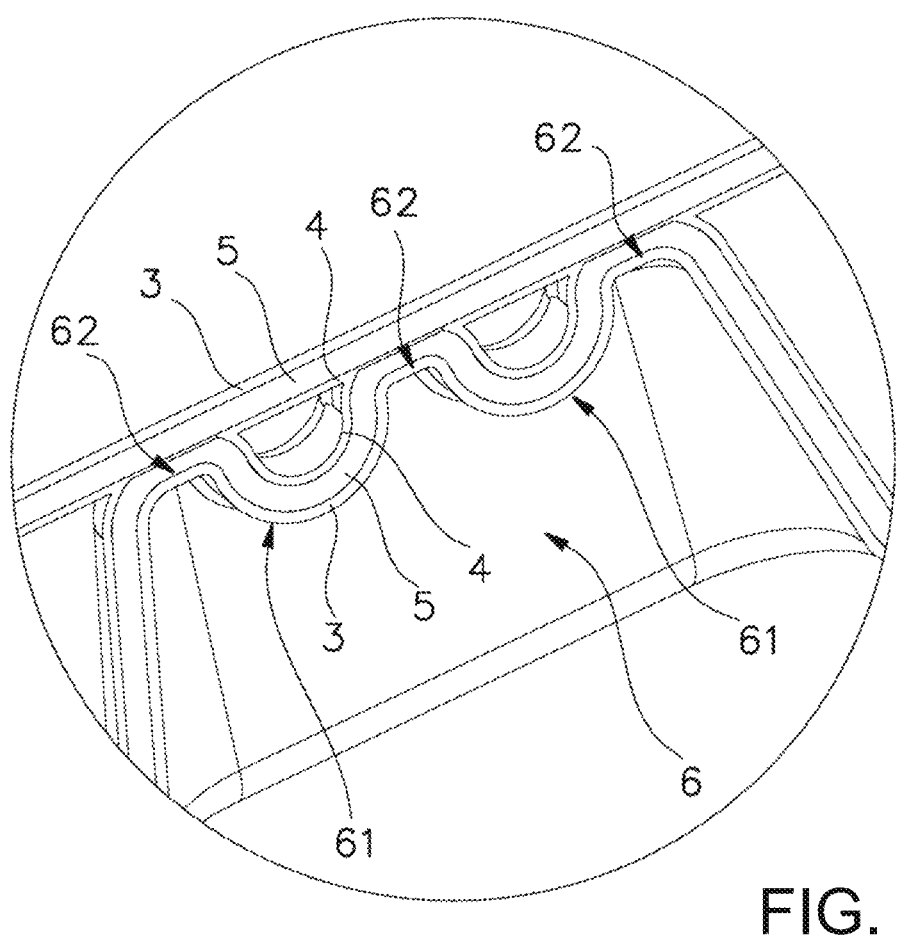
FIG. 2 is an enlarged perspective view of the blow-molded panel at section A of FIG. 1 according to the above first preferred embodiment of the present invention.
Figure 3:
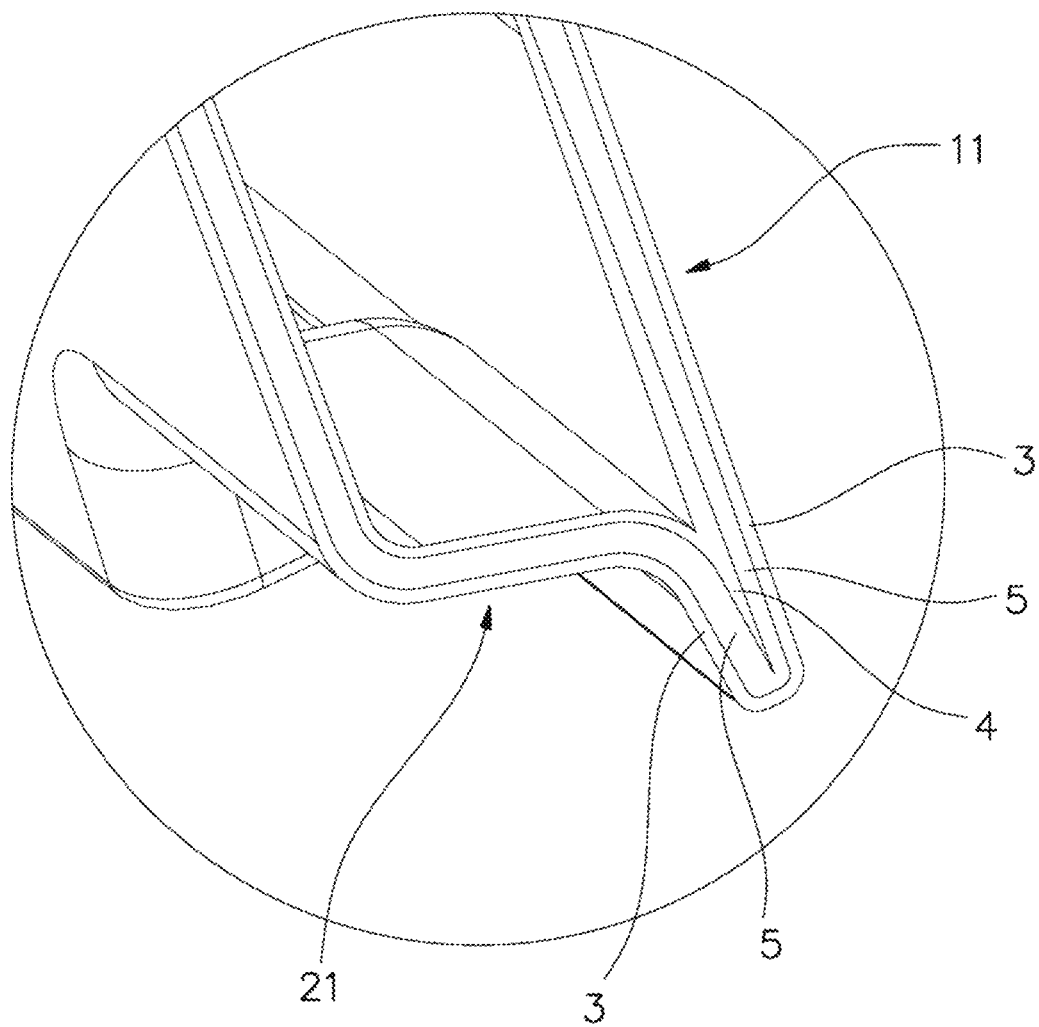
FIG. 3 is an enlarged perspective view of the blow-molded panel at section B of FIG. 1 according to the above first preferred embodiment of the present invention.

Referring to FIGS. 1 to 3 of the drawings, a blow-molded panel according to a first preferred embodiment of the present invention is illustrated, wherein the blow-molded panel comprises an upper panel member 1 and a lower panel member 2. The upper and lower panel members 1, 2 are space apart with each other to form a hollow structure through a blow molding process.

According to the preferred embodiment, each of the upper and lower panel members 1, 2 is constructed to have a triple layer structure. In other words, each of the upper and lower panel members 1, 2 comprises an outer layer 3, an intermediate layer 5, and an inner layer 4 sandwiched together. In addition, the lower panel member 2 has a square wave configuration that portions of the lower panel member 2 are extended upwardly to the upper panel member 1, wherein the lower panel member 2 is stretched and recessed to the upper panel member 1 at a position that the inner layer 4 of the lower panel member 2 is fused with the inner layer 4 of the upper panel member 1 to form a plurality of predetermined supporting structures 6 distributed underneath the upper panel member 1.

FIG. 3 illustrates the edge structure of the blow-molded panel, wherein the upper panel member 1 further comprises an outer bending wall 11 being bent downwardly at an outer edge of the upper panel member 1. The lower panel member 2 further comprises an inner bending wall 21 being bent downwardly at an outer edge of the lower panel member 2. A bottom of the inner layer 4 of the outer bending wall 11 and a bottom of the inner layer 4 of the inner bending wall 21 are integrated with each other.

According to the preferred embodiment, each of the supporting structures 6, having a sinusoidal waveform, is configured to have an elongated shape or strip shape, wherein each of the supporting structures 6 comprises two reinforcing ribs 61. As shown in FIGS. 1 and 2, the supporting structure 6 is configured to have two reinforcing ribs 61 and three contacting points 62 alternating with the reinforcing ribs 61.

For the raw material structure of the double panel members with triple layer configuration of the blow-molded panel, the outer layers 3 of the upper and lower panel members 1, 2 are made of high density polyethylene. The intermediate layers 5 of the upper and lower panel members 1, 2 are made of a mixture of high density polyethylene and calcium carbonate or a mixture of high density polyethylene and glass fiber. The inner layers 4 of the upper and lower panel members 1, 2 are made of metallocene polyethylene.

As a result, the outer layer 3 has the properties of high surface strength, scratch resistance, and oil resistance. The inner layer 4 has a low thermoplastic shrinkage ratio and provides rigid frame structure support. The intermediate layer 5 has a predetermined elasticity and energy absorption and high strength, and provides an effective buffering effect to any impact and drop which may damage the panel.

In one embodiment, when the intermediate layer 5 is made of a mixture of high density polyethylene and calcium carbonate, the mass percentage of high density polyethylene is 70-85%, and the mass percentage of calcium carbonate is 15-30%.

In one embodiment, when the intermediate layer 5 is made of a mixture of high density polyethylene and glass fiber, the mass percentage of high density polyethylene is 60-85%, and the mass percentage of glass fiber is 15-40%.

For the raw material structure of the double panel members with triple layer configuration of the blow-molded panel, the inner layer 4 can be broken to absorb the energy when an external force is applied on the outer layer 3 due to the high impact or drop. Due to the material properties of the intermediate layer 5, the intermediate layer 5 provides a relatively high resilient tensile force to restore the inner layer 4 so as to ensure the integrity of the panel and the function of the panel. Therefore, the hollow composite panel has the advantages of high surface strength, high flatness, excellent impact resistance, excellent deformation resistance, excellent rigid structure, higher performance and long service life.

The multi-panel multi-layer configuration of the blow-molded panel of the present invention is able to apply to many different applications. For example, the blow-molded panel can be applied to tables and chairs, such as tabletop panels, seat panels, and back panels etc. The blow-molded panel can also be applied to other products where the panel is easy to break. The blow-molded panel can be applied to building materials such as wall partitions, wall panels, door panels, fence panels, outdoor floors, insulation panels, and partition panels.

According to the first preferred embodiment of the present invention, the parameters of the high density polyethylene used in the outer layer 3 are shown as follows: melting rate: 1.5 g/10 min, bending strength: 900 MPa, Shore D69.

According to the first preferred embodiment of the present invention, the parameters of the high density polyethylene used in the intermediate layer 5 are as follows: melting rate: 0.35 g/10 min, bending strength: 1050 MPa, Shore D63.

According to the first preferred embodiment of the present invention, the parameters of the metallocene polyethylene used in the inner layer 4 are as follows:

Melting rate: 2.0 g/10 min;
Elongation at break: 420% in longitudinal direction and 830% in transverse direction;
Tensile strength at break: longitudinal 62 MPa, transverse 25 MPa;
Dart impact strength <48 g;
Eikmandorf tearing strength: 21° C. in longitudinal direction, 430° C. in transverse direction.

Furthermore, a person who skilled in the art should understand that, as an example of a simplified application, the outer layer, the intermediate layer and the inner layer can be made of the same material, or the material with different grades or different levels. For example, the outer layer, the intermediate layer and the inner layer can be made of high density polyethylene. In addition, the outer layer can be made of material having high hardness level and bright color, the intermediate layer can be a composite layer, and the inner layer can be made of recycled materials and a predetermined proportion of structural filling materials. These configurations can save the material cost and allow quick color changing capability.

Embodiment 2

Figure 4:
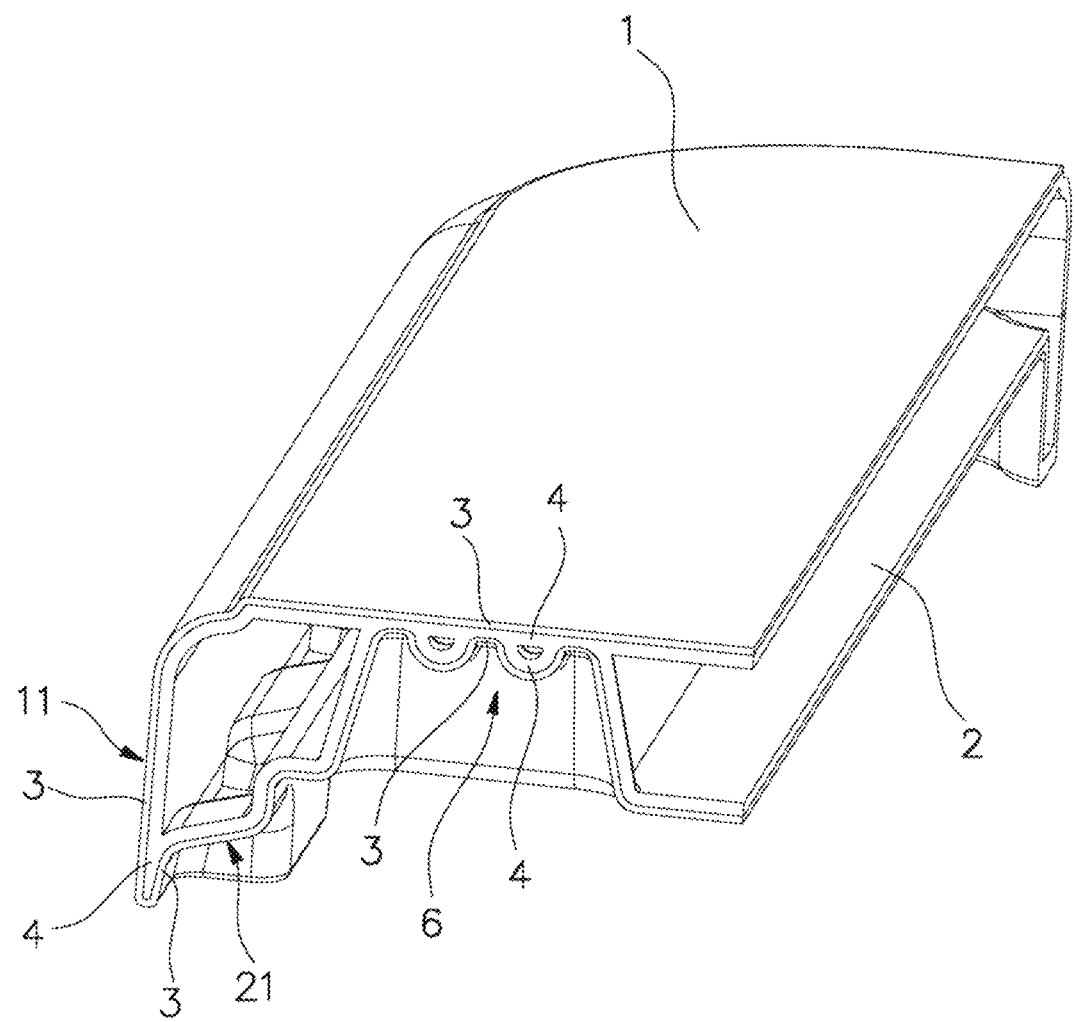
FIG. 4 is a sectional perspective view of a blow-molded panel according to a second preferred embodiment of the present invention.

As shown in FIG. 4, the blow-molded panel according to a second embodiment illustrates an alternative mode, wherein the blow-molded panel comprises an upper panel member 1 and a lower panel member 2 each having a double-layer configuration. In other words, each of the upper and lower panel members 1, 2 is constructed to have an outer layer 3 and an inner layer 4. Accordingly, the lower panel member 2 has a square wave configuration that portions of the lower panel member 2 are extended upwardly to the upper panel member 1, wherein the lower panel member 2 is stretched and recessed to the upper panel member 1 at a position that the inner layer 4 of the lower panel member 2 is fused with the inner layer 4 of the upper panel member 1 to form a plurality of predetermined supporting structures 6 distributed underneath the upper panel member 1.

For the raw material structure of the double panel members with triple layer configuration of the blow-molded panel, the outer layers 3 of the upper and lower panel members 1, 2 are made of high density polyethylene. The inner layers 4 of the upper and lower panel members 1, 2 are made of a mixture of high density polyethylene, metallocene polyethylene and calcium carbonate, or a mixture of high density polyethylene, metallocene polyethylene and glass fiber.

According to the second preferred embodiment of the present invention, for the inner layer 4, the mass percentage of metallocene polyethylene is 10-15%, the mass percentage of calcium carbonate is 15-20%, and the rest is high density polyethylene. Alternatively, for the inner layer 4, the mass percentage of the metallocene polyethylene is 10-15%, the mass percentage of the glass fiber is 15-25%, and the rest is high density polyethylene.

In addition, the parameters of the high density polyethylene and metallocene polyethylene applied in this embodiment can refer to the above Embodiment 1, and the description will not be expanded here.

The above descriptions are for the preferred embodiments of the present invention. It should be pointed out that for a person who skilled in the art, without departing from the principle of the present invention, various modifications or improvements can be made to the present invention. For example, the outer layer, the intermediate layer, and the inner layer of the upper layer member and the outer layer, the intermediate layer, and the inner layer of the lower layer member can be configured to have more than one layer structure, which should be within the scope of the present invention.

According to one aspect of the present invention as a modification, as shown in FIGS. 5A to 6C, the present invention provides a blow-molded panel 1' which is constructed to have at least two polymer layers, wherein one of the polymer layers of the blow-molded panel 1' is directly or indirectly fused or at least partially fused to another polymer layer. The adjacent polymer layers can be fused directly or joined through an intermediate material layer, wherein the intermediate material layer can be at least one bonding agent layer or at least one other polymer layer, or a mixture of bonding agent and polymer layer.

The polymer layer as an outer layer of the blow-molded panel 1' can be colored or colorless. According to different usage scenarios, the thickness of a single layer of the blow-molded panel 1' has a range from 0.1 mm to 5 mm.

The blow-molded panel 1' has a hollow structure. Particularly, the blow-molded panel 1' comprises a first panel member 10' and a second panel member 20', i.e. the outer and inner layers, wherein the first and second panel members 10', 20' are blow molded to form a cavity 100' therebetween. In other words, the first and second panel members 10', 20' are spaced apart each other. The thickness of each of the first and second panel members 10', 20' has a range from 1 mm to 5 mm, preferably from 2 mm to 3 mm.

The blow-molded panel 1' comprises a first polymer layer 30' and a second polymer layer 40', wherein at least a portion of the first polymer layer 30' and at least a portion of the second polymer layer 40' are mutually overlapped with each other. The first panel member 10' is constructed to have at least one of the first and second polymer layers 30', 40' or both of the first and second polymer layers 30', 40'. The second panel member 20' is constructed to have at least one of the first and second polymer layers 30', 40' or both of the first and second polymer layers 30', 40'.

It should be understood that "layer" here does not refer that the first polymer layer 30' or the second polymer layer 40' having an obvious boundary. The first polymer layer 30' and the second polymer layer 40' can be made of the same material, and the connection of the first polymer layer 30' and the second polymer layer 40' can be blurred, such as a fusion, bonding, or superimposed integral composite structure. The first polymer layer 30' and the second polymer layer 40' can also be made of different materials.

The thickness of the first polymer layer 30' or the second polymer layer 40' have a range from 0.1 mm to 5 mm. The thickness of the first polymer layer 30' and the second polymer layer 40' can be the same or different.

When the first polymer layer 30' is located at an exterior of the panel, it can be understood that the first polymer layer 30' serves as an outer layer. However, it should not exclude that the surface of the first polymer layer 30' is covered with another thin layer for providing a better scratch resistance of the first polymer layer 30'. Optionally, the first polymer as a material for forming the first polymer layer 30' may be solvent resistant or non-toxic. It should be understood that a colorant may be included in the first polymer.

The second polymer as a material for forming the second polymer layer 40' can be selected for extrusion blow molding with the first polymer together, wherein the second polymer of the second polymer layer 40' can be directly or indirectly fused with the first polymer of the first polymer layer 30'.

According to this embodiment, the first polymer layer 30' and the second polymer layer 40' are both continuous layers. In other words, the first polymer layer 30' is extended at the periphery of the second polymer layer 40' and is not interrupted by any other layer. Similarly, the second polymer layer 40' is extended at the first polymer layer 30' and is not interrupted by any other layers.

Preferably, the second polymer for making the second polymer layer 40' is the material having impact resistance or better structural strength. The first polymer layer 30' is positioned at an outer side of the second polymer layer 40'. The second polymer layer 40' positioned at an inner side of the first polymer layer 30' to play a supporting role or to provide a buffering effect.

Furthermore, the blow-molded panel 1' further comprises a third polymer layer 50', wherein the first polymer layer 30' is overlapped with the second polymer layer 40', and the second polymer layer 40' is overlapped with the third polymer layer 50'. The third polymer as a material for forming the third polymer layer 50' can be selected for extrusion blow molding with the second polymer layer 40' together, wherein the third polymer of the third polymer layer 50' can be directly or indirectly fused with the second polymer of the second polymer layer 40'.

Alternatively, when the third polymer layer 50' is configured to have better structural strength, the second polymer layer 40' is configured to have better impact resistance. The second polymer layer 40' is sandwiched between the first polymer layer 30' and the third polymer layer 50'. When the external force is impacted to the blow-molded panel 1', the second polymer layer 40' is configured to provide an energy absorbing function, so as to reduce the external force being impacted to the first polymer layer 30' and the third polymer layer 50'. In other words, the impact resistance requirements for the first polymer layer 30' and the second polymer layer 40' can be reduced.

Similarly, the third polymer layer 50' is configured to have better structural strength to reduce the required structural strength of each of the first polymer layer 30' and the second polymer layer 40'.

In other words, by configuring the multi-layer of the blow-molded panel 1', such as forming the double layer structure of the first panel member 10' and the single layer structure of the second panel member 20', each panel member provides its own capabilities to enhance the overall performance of the blow-molded panel 1'. Therefore, the material requirement of the blow-molded panel 1' will be substantially reduced and at the mean time, the blow-molded panel 1' can achieve better result beyond the expectation of the single layered panel.

The manufacturing method of the blow-molded panel 1' involves an extrusion or co-extrusion blow molding process, wherein the polymer can be heated to a predetermined temperature to ensure the polymer in fluid form for being extruded. After cooling the polymer, the desired blow-molded panel 1' is formed.

In addition, the lower panel member 20' has a square wave configuration that portions of the lower panel member 20' are extended upwardly to the upper panel member 10', wherein the lower panel member 20' is stretched and recessed to the upper panel member 10' to form a plurality of predetermined supporting structures 60' to support the upper panel member 10'. The second panel member 20' comprises a second panel main body 21' integrally extended to at least one of the supporting structures 60'. The second panel main body 21' is spaced apart from the first panel member 10', wherein the supporting structure 60' is extended toward the first panel member 10'.

The supporting structure 60' is able to increase the supporting strength of the blow-molded panel 1' by modifying the structural configuration thereof. It is worth mentioning that since the blow-molded panel 1' is manufactured by the blow molding method, the supporting structures 60' will not increase the overall weight of the blow-molded panel 1'. In other words, by increasing the number of the supporting structures 60', the overall weight of the blow-molded panel 1' will not be increased.

The thicknesses of the first polymer layer 30', the second polymer layer 40' and the polymer third layer 50' of the first panel member 10' are different than these of the second panel member 20'. At least a portion of the second panel member 20' is stretched to form the supporting structure 60'. In other words, at the predetermined position of the second panel member 20', portions of the first polymer layer 30', the second polymer layer 40' and the third polymer layer 50' are stretched to form the supporting structure 60'. Therefore, at least a portion of the thickness of the supporting structure 60' is smaller than the thickness of the first panel member 10", such that the thickness of the supporting structure 60' is relatively thinner to facilitate heat dissipation at the supporting structure 60'.

Further, when the supporting structure 60' is extended close to the first panel member 10', the thickness of the supporting structure 60' is reduced to enhance the heat dissipation around the first panel member 10'.

It should be understood that the supporting structure 60' and the first panel member 10' can be mutually fused. For example, at least a portion of the supporting structure 60' and at least a portion of the first panel member 10' can be fused with each other. Alternatively, the supporting structure 60' can be extended to biased against the first panel member 10', or the supporting structure 60' and the first panel member 10' can be spaced apart from each other. Therefore, the supporting structure 60' and the first panel member 10' can be relatively moved from each other, such that the first panel member 10' can be supported by the supporting structure 60'. Alternatively, other supporting means is provided between the supporting structure 60' and the first panel member 10', such that the first panel member 10' can be supported by the supporting structure 60'.

When the size of the blow-molded panel 1' is relatively large, the number of the supporting structures 60' must be increased, wherein the supporting structures 60' can be formed in an interval manner or can be intersected or staggered with each other. For example, the supporting structures 60' are extended and distributed at the horizontal and vertical directions to effectively distribute the external force from one direction to multiple directions, so as to enhance the structural strength and distortion resistance of the blow-molded panel 1'. It is important that the blow-molded panel 1' can be manufactured with a thinner configuration, wherein the structural strength of the thinner blow-molded panel 1' is stronger than that of the conventional thicker blow-molded panel.

Furthermore, the second panel member 20' further comprises at least one reinforcing rib 70', wherein the reinforcing rib 70' is integrally provided at the supporting structure 60' to enhance the strengthen thereof. Particularly, at least a portion of the second panel member 20' is stretched and recessed to form the supporting structure 60', such that at least one recessed cavity 200' is formed at an outer side of the second panel member 20'. Accordingly, the reinforcing rib 70' is provided at the supporting structure 60' and is disposed in the recessed cavity 200'. The recessed cavity 200' is configured to have a W-shaped cross section, and the overall shape thereof is configured to have an oblong shape with two arc-shaped ends, wherein peripheral walls of the recessed cavity 200' are upwardly and inwardly extended as inclined walls to form the supporting structure 60' of the second panel member 20'. The reinforcing rib 70' can be seen from on the outer side of the second panel member 20'.

According to this embodiment, at least a portion of the supporting structure 60' is outwardly protruded outward to form the reinforcing rib 70'. At least a portion of a supporting top wall 62' of the supporting structure 60' is outwardly protruded to define two or more peak points 63', wherein the reinforcing rib 70 is formed between the adjacent peak points 63'. The number of the reinforcing ribs 70' can be multiple and the reinforcing ribs 70' are formed with a predetermined interval.

According to this embodiment, each of the supporting structures 60' is provided with a pair of reinforcing ribs 70', wherein the reinforcing ribs 70' are horizontally extended to across a bottom of the recessed cavity 200' which is the corresponding top of the supporting structure 60'. The reinforcing rib 70' is formed in a U-shaped wave manner, wherein the reinforcing rib 70' can be integrally extended to the supporting structure 60', or can be formed by outwardly extending at least a portion of the supporting structure 60'.

It is worth mentioning that the wave-shaped structure of the reinforcing rib 70' is the best reinforcing structure, such that the two wave-shaped reinforcing rib 70' in pair will form the supporting structure 60' with three-peak wave configuration, which greatly strengthens the second panel member 20' to provide the impact resistance and to enhance the rigidity.

The second panel member 20' is formed with at least one contact peak point 63', wherein the contact peak point 63' is located higher than the surrounding portion and is close to the first panel member 10'.

Particularly, the supporting structure 60' is constructed to have a supporting sidewall 61' and the supporting top wall 62', wherein the supporting sidewall 61' is integrally extended from the second panel main body 21' and is extended around the supporting top wall 62'. The first panel member 10' is supported on the supporting top wall 62'. The supporting top wall 62' can be configured to have an arc-shape to form the peak point 63' thereat. The supporting top wall 62' is configured to have a wave form to form two or more peak points 62'. In one embodiment, three peak points 62' are formed at the supporting top wall 62'.

In other words, at least a portion of the second panel member 20' is extended toward the cavity, which is extended toward the first panel member 10' to define the peak point 63' at the second panel member 20'. Accordingly, the portion of the second panel member 20' is stretched and recessed toward the first panel member 10' until the third polymer layer 50' of the second panel member 20' and the third polymer layer 50' of the first panel member 10' are fused with each other to form the peak point 63'. The first panel member 10' is supported at a position of the peak point 63'. The first panel member 10' can be supported at the position of the peak point 63', such that by configuring the first panel member 10' to be only supported by and contacted with the peak point 63', the contacting area between the first panel member 10' and the second panel member 20' can be minimized so as to enhance the heat dissipation and demolding during the manufacturing process.

At least a portion of the second panel member 20' is formed in a wave form to define the peak point 63'. The number of peak point 63' can be varied and configured with a predetermined interval when two or more peak points 63' are formed. The reinforcing ribs 70' and the peak points 63' are located within the recessed cavity 200' and are configured in a concave-convex arrangement, such that the reinforcing ribs 70' and the peak points 63' are alternating with each other to form the supporting structure 60'.

In other words, the peak points 63' are formed with the supporting structure 60'. At least a portion of the supporting structure 60' is outwardly extended to form the reinforcing rib 70' with two spaced apart peak points 63'.

As shown in FIGS. 5A to 6C, the supporting structure 60' is configured to have three peaks to form three peak points 63'. At the position of each of the supporting structure 60', the third polymer layer 50' of the second panel member 20' is stretched and recessed to the third polymer layer 50' of the first panel member 10' and is fused to the third polymer layer 50' of the first panel member 10' to form an integrated body. In this embodiment, a portion of the third polymer layer 50' of the second panel member 20' is contacted with a portion of the third polymer layer 50' of the first panel member 10'. Therefore, the second panel member 20' is combined with the first panel member 10' by the peak points 63' of the supporting structure 60' in order to form a hollow panel. Accordingly, the second panel member 20' is configured in a wave form with three peak structure of the supporting structure 60' to form the reinforcing ribs 70'. Since the peak points 63' are coupled at the first panel member 10', the reinforcing support and structure of the first panel member 10' will be formed. The external impact and force applied to the first panel member 10' will be directly and evenly distributed to the second panel member 20' so as to provide a supporting force to the first panel member 10'. Furthermore, the cavity 100' between the first panel member 10' and the second panel member 20' is configured to provide cushioning and shock absorbing effects.

Figure 5A:
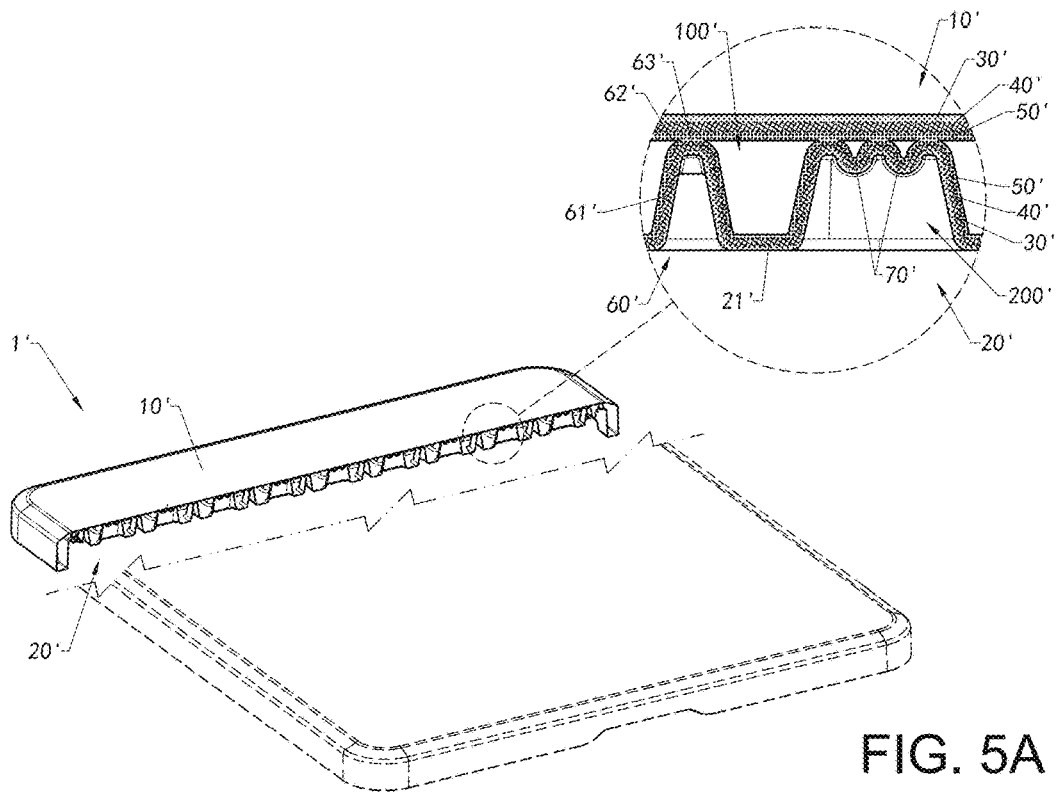
FIG. 5A is a sectional view of the blow-molded panel according to the above first preferred embodiment of the present invention.
Figure 5B:
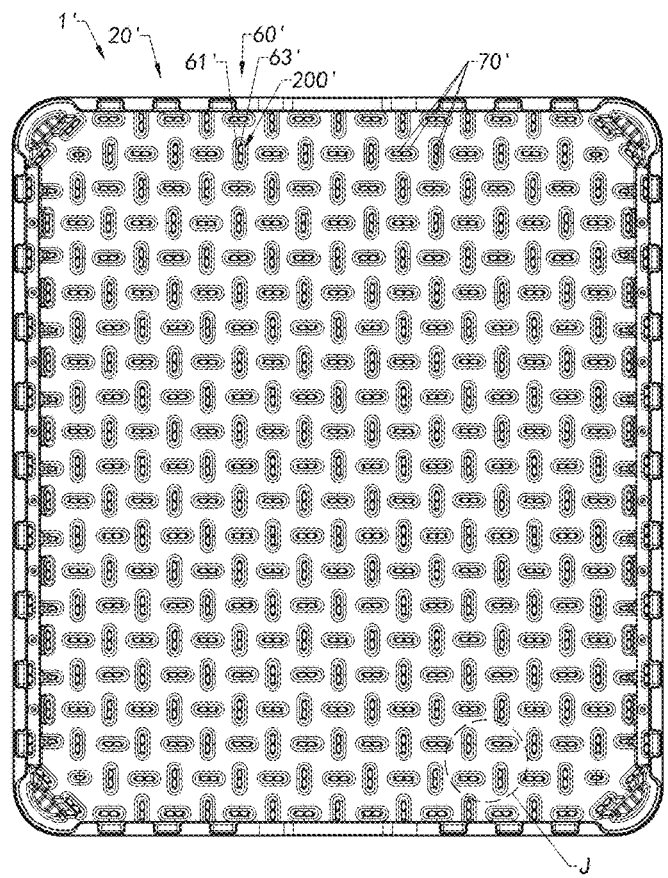
FIG. 5B is a bottom view of the blow-molded panel according to the above first preferred embodiment of the present invention.
Figure 6A:
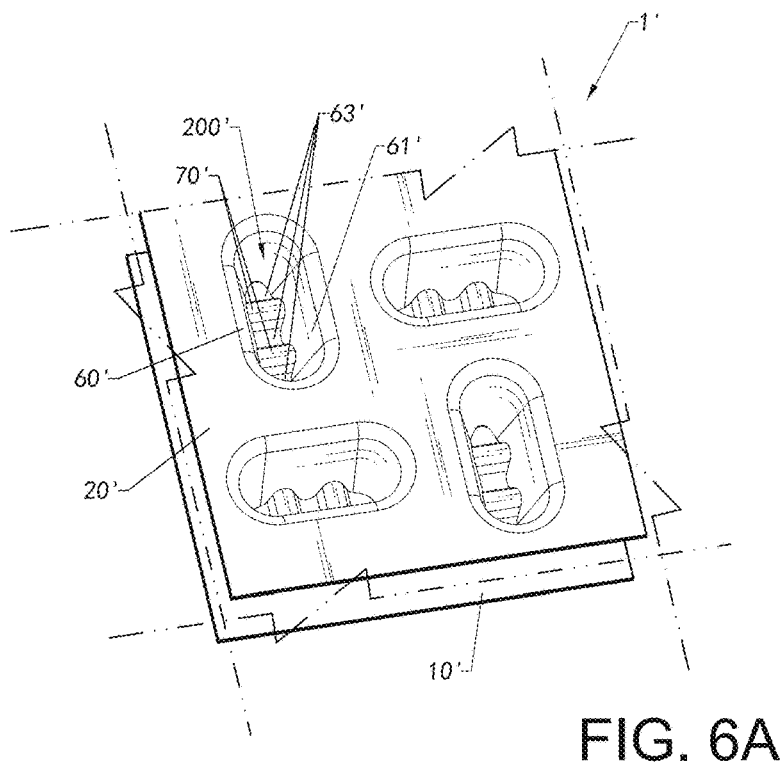
FIG. 6A is an enlarged sectional view of the blow-molded panel at section J of FIG. 5B according to the above first preferred embodiment of the present invention.
Figure 6B:
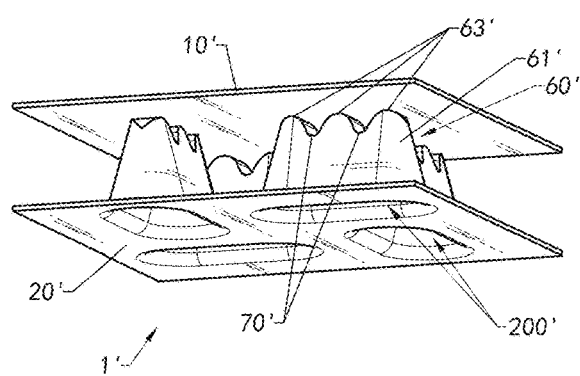
FIG. 6B is an enlarged perspective view of the blow-molded panel at section J of FIG. 5B according to the above first preferred embodiment of the present invention.
Figure 6C:
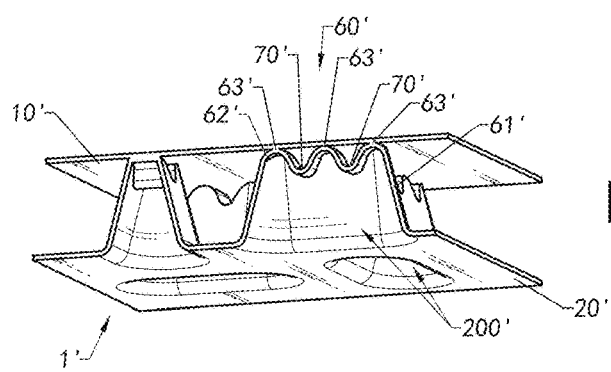
FIG. 6C is another enlarged sectional view of the blow-molded panel at section J of FIG. 5B according to the above first preferred embodiment of the present invention.

As shown in FIG. 5B, a plurality of supporting structures 60' are evenly distributed in the vertical and horizontal directions and are spaced apart at an even interval, such that the vertical extending supporting structures 60' and the horizontal extending supporting structures 60' are alternating with each other. Therefore, the material cost and the overall weight of the blow-molded panel 1' will be substantially reduced to have the hollow structure. On the other words, the blow-molded panel 1' provides an impact resistant and rigid structure that crosses the vertical and horizontal directions. Furthermore, through the peak points 63' of each of the supporting structures 60', the multiple joints between the first panel member 10' and the second panel member 20' are evenly distributed and formed to fuse the first panel member 10' and the second panel member 20'. Therefore, the first panel member 10' and the second panel member 20' are integrated with each other, such that the external impact and force on the first panel member 10' can be directly and evenly distributed to the second panel member 20' so as to evenly distribute the external impact and force. Then, once the external impact and force is evenly distributed at the blow-molded panel 1', the external impact and force will be transferred to the ground via a panel supporting structure, such as supporting legs supported on the ground.

Figure 7:
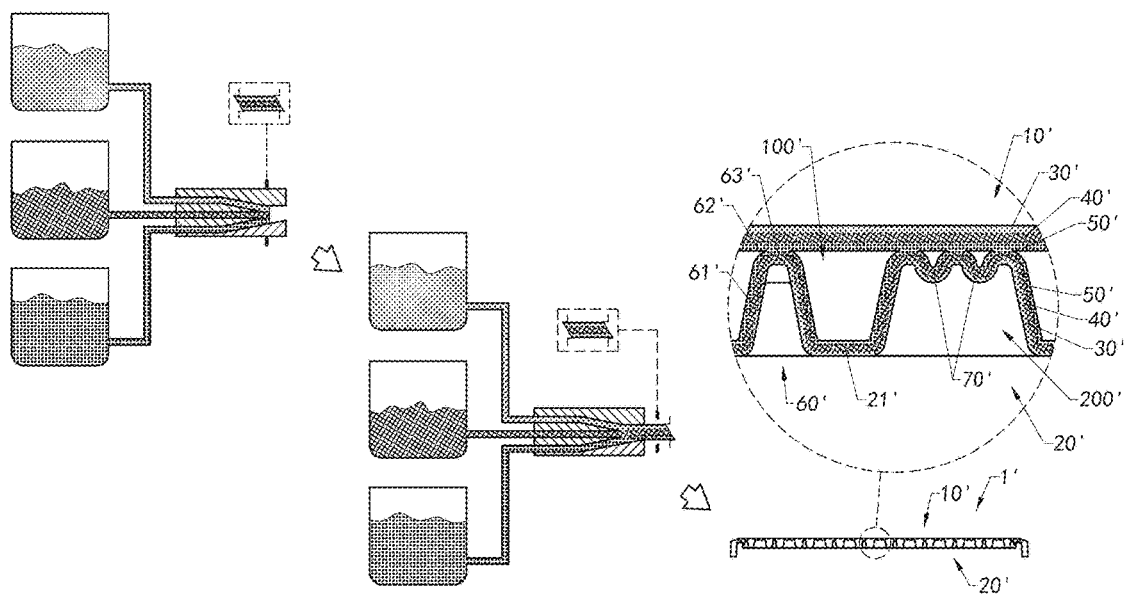
FIG. 7 is a flow diagram illustrating a manufacturing method of the blow-molded panel according to the above first preferred embodiment of the present invention.
Figure 8:
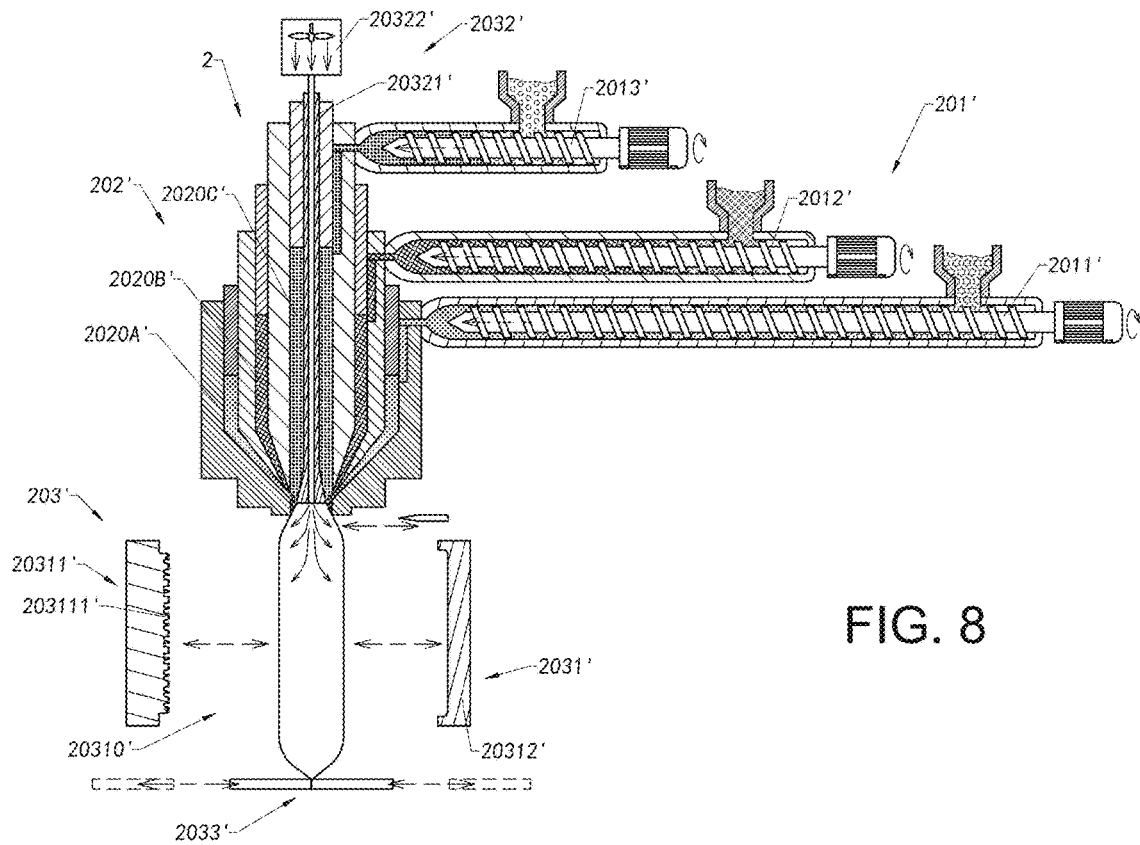
FIG. 8 illustrates a blow molding equipment for manufacturing the blow-molded panel according to the above first preferred embodiment of the present invention.
Figure 9:
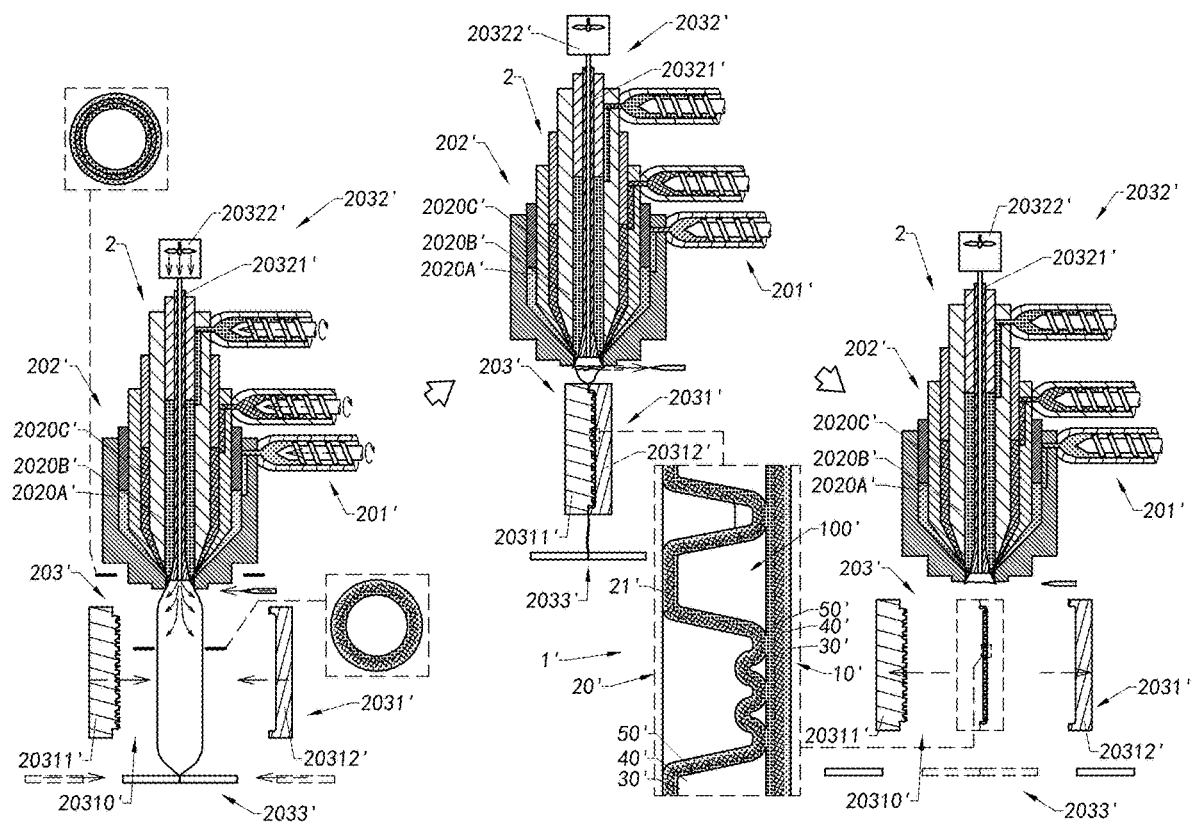
FIG. 9 is a schematic diagram of the blow molding equipment for manufacturing the blow-molded panel according to the above first preferred embodiment of the present invention.

Referring to FIG. 7 of the drawings, a manufacturing method of the blow-molded panel 1' according to the abovementioned preferred embodiment of the present invention is illustrated.

First, heat the first polymer of the first polymer layer 30', the second polymer of the second polymer layer 40', and the third polymer of the third polymer layer 50' respectively at a predetermined temperature to obtain the first polymer, the second polymer and the third polymer in fluid form.

Then, co-extrude the first polymer, the second polymer and the third polymer to form the first polymer layer 30', the second polymer layer 40' and the third polymer layer 50' respectively, wherein an inner surface of the first polymer layer 30' and an outer surface of the second polymer layer 40' are fused with each other, and an inner surface of the second polymer layer 40' and an outer surface of the third polymer layer 50' are fused with each other.

It is worth mentioning that, alternatively, in the co-extrusion step, the polymer layer 30' and an outer surface of the second polymer layer 40' are fused with each other and are surrounded to form the cavity 100'. The first polymer layer 30' is a continuous material layer to surround the second polymer layer 40', and the second polymer layer 40' is a continuous material layer to surrounds the third polymer layer 50'. In other words, after co-extruding the first polymer layer 30', the second polymer layer 40' and the third polymer layer 50', surrounding the first polymer layer 30', the second polymer layer 40' and the third polymer layer 50' to form the cavity 100'.

Then, the first polymer layer 30', the second polymer layer 40' and the third polymer layer 50' are fused with each other and placed in a mold for molding. A flow of gas can be blown into the mold, such that the first polymer layer 30', the second polymer layer 40' and the third polymer layer 50' are biased against an inner wall of the mold, Therefore, the first polymer layer 30', the second polymer layer 40' and the third polymer layer 50' can be molded along the inner wall of the mold.

The molded first polymer layer 30', the second polymer layer 40' and the third polymer layer 50' are then cooled and demolded to form the blow-molded panel 1'.

It should be understood that the method of cooling the first polymer layer 30', the second polymer layer 40' and the third polymer layer 50' can be achieved by the introduction of gas. The gas can be any commercially available gas in a pressurized tank, or it can be air. The gas itself should not harmful to the first polymer, the second polymer, and the third polymer, and should not damage the mold. The gas can be, but should not be limited to, air, helium, neon, argon, or any combination of the foregoing. Of course, it should be understood that the cooling method of the blow-molded panel 1' after molding should not be limited to the above-mentioned air cooling method.

It should be understood that the first polymer, the second polymer and the third polymer are preferably formed in a melting state before they are extruded, wherein the first polymer, the second polymer, and the third polymer can be heated separately to maintain their fluidities. The extrusion step is performed during the heating process, such that the first polymer, the second polymer and the third polymer are heated uniformly, so as to enhance uniformity of the first polymer, the second polymer, and the third polymer.

It should be understood that when the first polymer, the second polymer and the third polymer are respectively extruded to form the first polymer layer 30', the second polymer layer 30', the second polymer 40' and the third polymer layer 50', wherein the first polymer layer 30', the second polymer layer 30', the second polymer 40' and the third polymer layer 50' are fused with each other. A person who skilled in the art can select the first polymer, the second polymer, and the third polymer, so that the first polymer, the second polymer, and the third polymer has good viscosity after being heated.

As shown in FIGS. 5A to 6C, 8 and 9, a blow molding process and the related blow molding equipment 2' according to the preferred embodiment of the present invention are illustrated.

The blow molding equipment 2' comprises a feeding unit 201', an extrusion unit 202', and a blow molding unit 203', wherein the first polymer, the second polymer, and the third polymer are respectively fed to the feeding unit 201'.

The feeding unit 201' comprises a first feeding screw rod 2011', a second feeding screw rod 2012', and a third feeding screw rod 2013', wherein the first polymer is fed through the first feeding screw rod 2011', the second polymer is fed through the second feeding screw rod 2012', and the third polymer is fed through the third feeding screw rod 2013'.

The first feeding screw rod 2011', the second feeding screw rod 2012', and the third feeding screw rod 2013' can be configured to heat up the first polymer, the second polymer, and the third polymer respectively to ensure the first polymer, the second polymer, and the third polymer in a fluid state. It should be understood that before feeding the first polymer, the second polymer, and the third polymer into the first feed screw rod 2011', the second feed screw rod 2012', and the third feed screw rod 2013', a mixing step may be performed, for example, the resin material and the plastic additive are mixed and then fed to the feeding unit 201'.

The first feed screw rod 2011', the second feed screw rod 2012', and the third feed screw rod 2013' are arranged for heat treating the first polymer, the second polymer and the third polymer respectively. In one embodiment, the operating temperatures of the first feeding screw rod 2011', the second feeding screw rod 2012', and the third feeding screw rod 2013' are set with a range from 160° C. to 180° C. It should be understood that according to the transformation of the first polymer, the second polymer, and the third polymer, the heating temperatures thereof can be adjusted correspondingly, such that the first polymer, the second polymer and the third polymer are respectively heated to a desired fluid state, so as to maintain a desired flow speed and viscosity.

Furthermore, in one embodiment, the first polymer layer 30' of the blow-molded panel 1' is implemented to have the properties of high surface strength, scratch resistance, and oil stain resistance. The second polymer layer 40' is implemented to have an energy absorbing structure or a material with high rigid ability and can effectively provide a buffering effect of the blow-molded panel due to any external impact or drop. The third polymer layer 50' is implemented to have a low thermoplastic shrinkage ratio and to provide frame support.

Particularly, the first polymer is implemented as high-density polyethylene, and the parameters related to the high density polyethylene may be melting rate: 1.5 g/10 min, bending strength: 900 MPa, and Shore D69.

The second polymer is implemented as a mixture of high density polyethylene and calcium carbonate or a mixture of high density polyethylene and glass fiber. For the first example of the second polymer made of the mixture of high-density polyethylene and calcium carbonate, the mass percentage of calcium carbonate is 15-30%, the mass percentage of high-density polyethylene is 70-85%, and the parameters related to high-density polyethylene are melting rate: 0.35 g/10 min, bending strength 1050 MPa, Shore D63. For the second example of the second polymer made of the mixture of high-density polyethylene and glass fiber, the mass percentage of glass fiber is 15-40%, the mass percentage of high density polyethylene is 60-85%, and the related parameters of high-density polyethylene are melting rate: 0.35 g/10 min, bending strength 1050 MPa, Shore D63.

The third polymer is implemented as metallocene polyethylene. The related parameters of the metallocene polyethylene are melting rate: 2.0 g/10 min, elongation at break: longitudinal 420%, transverse 830%, tensile strength at break: longitudinal 62 MPa, transverse 25 MPa, dart impact strength <48 g, Elmendorf tear strength: longitudinal 21° C., transverse 430° C.

It should be understood that the materials of the first polymer layer 30', the second polymer layer 40', and the third polymer layer 50' are not limited to the aforementioned materials. A person who skilled in the art can select suitable materials for each layer of the blow-molded panel 1' according to the characteristics of the materials.

The second polymer layer 40' can be embodied as a micro-foam layer to provide a cushioning effect. Since the second polymer layer 40' is located and sandwiched between the first polymer layer 30' and the third polymer layer 50', the second polymer layer 40' can be selected in different colors, such as black color. The second polymer layer 40' can also be made of recycled plastic to reduce material cost.

The second polymer layer 40' is embodied as an intermediary layer. Via the second polymer layer 40', the first polymer layer 30' and the third polymer layer 50' are bonded or adhered together. For example, at least a portion of the first polymer layer 30' and at least a portion of the second polymer layer 40' are fused with each other, and at least a portion of the second polymer layer 40' and the third polymer layer 50' are fused with each other. However, the first polymer layer 30' and the third polymer layer 50' are difficult to adhere to or fuse with each other. It should be understood that the intermediate layer does not have to be made of polymer, and it can be an inorganic adhesive or other types of connecting media.

The extrusion unit 202' is operatively connected to the first feeding screw rod 2011', the second feeding screw rod 2012', and the third feeding screw rod 2013' of the feeding unit 201'. The extrusion unit 202' has a first extrusion channel 2020A', a second extrusion channel 2020B' and a third extrusion channel 2020C'. The first extrusion channel 2020A' is operatively connected to a first feeding channel of the first feeding screw rod 2011'. The second extrusion channel 2020B' is operatively connected to a second feeding channel of the second feeding screw rod 2012'. The third extrusion channel 2020C' is operatively connected to a third feeding channel of the third feeding screw rod 2013'.

The number of the feeding channels of the feeding unit 201' and the number of the extrusion channels of the extrusion unit 202' can be set and modified according to requirements.

The sizes and shapes of first extrusion channel 2020A', the second extrusion channel 2020B', and the third extrusion channel 2020C' are selectively configured to form the first polymer layer 30', the second polymer layer 40' and the third polymer layer 50' with predetermined thicknesses and shapes.

It is worth mentioning that the size of each of the first extrusion channel 2020A', the second extrusion channel 2020B', and the third extrusion channel 2020C' is adjustable to control the thickness of the first polymer layer 30', the second polymer layer 40' and the third polymer layer 50'.

In this embodiment, the second extrusion channel 2020B' is coaxially aligned within the first extrusion channel 2020A', and the third extrusion channel 2020C' is coaxially aligned within the second extrusion channel 2020B'. After the third polymer is extruded from the third extrusion channel 2020C' to form the third polymer layer 50', at the same time, the second polymer is extruded from the second extrusion channel 2020B' to form the second polymer layer 40', the third polymer layer 50' is circumferentially encircled with and fused to the second polymer layer 40'. Similarly, the second polymer layer 40' is circumferentially encircled with and fused to the first polymer layer 30'.

After the first polymer layer 30', the second polymer layer 40', and the third polymer layer 50' are extruded and fused with each other at a predetermined length, an end thereof is sealed, such that the fused body has a closed end and an opened end for air ventilation.

It should be understood that the location of the opening should not be limited to the above example. The first polymer, the second polymer, and the third polymer can be extruded from top to bottom, wherein the opening, i.e. the opened end, can be formed on the upper side of the fused body. Alternatively, the opening can be formed on the lateral side or lower side of the fused body. A person who skilled in the art can select the location of the opening according to requirements.

Preferably, in this embodiment, the end of the fused body is sealed when 20% to 40% of the fused body is formed by extruding the first polymer layer 30', the second polymer layer 40', and the third polymer layer 50'. Then, a step of pre-blowing the air into the first polymer layer 30', the second polymer layer 40', and the third polymer layer 50' to form the cavity 100'.

The blow molding unit 203' comprises a molding die 2031' and an air blower 2032', wherein the air blower 2032' is configured to blow an air flow into the molding die 2031'. The air blower 2032' comprises at least one blowing needle 20321' and an air tank 20322', wherein the blowing needle 20321' is communicably connected to the air tank 20322'.

The air blower 2032' can be operatively installed in the extrusion unit 202', or can be independently connected to the extrusion unit 202'.

During the extrusion of the first polymer layer 30', the second polymer layer 40' and the third polymer layer 50', a left mold 20311' and a right mold 20312' of the molding die 2031' are moved toward each other to left and right sides of the fused body respectively. The fused body is gradually extruded into a molding space of the molding die 2031' between the left and right molds 20311', 20312', at the same time, the left and right molds 20311', 20312' are moved closer to each other until the fused body is completed formed within a molding space 20310' of the molding die 2031'.

It should be understood that according to the amount of material being fed, different numbers of fused body can be manufactured at one time. If small amount of material is fed in the feeding unit 201' for a single feeding manner, the extrusion unit 202' is configured to extrude all the first polymer, the second polymer, and the third polymer in a single feeding manner so as to form one single fused body. After the fused body is placed in the molding die 2031' for processing, the blow-molded panel 1' is formed.

Furthermore, at least one of an inner wall of the left mold 20311' and the right mold 20312' of the molding die 2031' is configured to have a predetermined shape, such as a wave form. At least a portion of the fused body is biased against the inner wall of the left mold 20311', and at least a portion of fused body is biased against the inner wall of the right mold 20312' to form the first panel member 10' and the second panel member 20' of the blow molding panel 1' respectively. In this process, since the first panel member 10' and the second panel member 20' are blown to maintain a relatively high pressure, the first polymer layer 30' and the second polymer layer 40' and the third polymer layer 50' can be fused closely.

For example, the left mold 20311' of the molding die 2031' is configured to mold the second panel member 20', and the right mold 20312' of the molding die 2031' is configured to mold the first panel member 10'.

The molding die 2031' further comprises at least one protrusion 203111' integrally formed at the left mold 20311', wherein the protrusion 203111' is correspondingly aligned with the supporting structure 60' of the second panel member 20'. When the fused body is biased against the left mold 20311', the fused body is stretched to form the second panel member 20' with the supporting structure 60'. Through this configuration, the overall weight of the second panel member 20' will not increased, but the structural strength of the blow-molded panel 1' can be enhanced. In other words, the weight of the second panel member 20' will not be changed, but the material thereof is stretched to form the supporting structure 60' so as to ensure no additional material of the second panel member 20' being added to form the supporting structure 60'. Thus, since the supporting structure 60' is stretched, the thickness becomes thinner, so as to enhance the heat dissipation in the subsequent steps.

The blowing operation to the molding die 2031' can be maintained during the closing and molding process of the molding die 2031'. The blow time can be set with a range from 65 to 70 seconds. Then, the gas is discharged and the molding die 2031' is cooled for demolding. This process will take 15-20 seconds to complete. Finally, the molded blow-molded panel 1' can be removed from the molding die 2031' once the molding die 2031' is opened.

Edges of the first panel member 10' and the second panel member 20' are connected to each other. During the closing process of the molding die 2031', some material may overflow and leak at the edge position, such that edges of the blow-molded panel 1' can be trimmed after the blow-molded panel 1' is formed.

It should be understood that in the above example, the blow-molded panel 1' is constructed to have the first polymer layer 30', the second polymer layer 40', and the third polymer layer 50', wherein the second polymer layer 40' is encircled by the first polymer layer 30', and the third polymer layer 50' is encircled by the second polymer layer 40'.

In another embodiment of the present invention, the first panel member 10' and/or the second panel member 20' of the blow-molded panel 1' can be constructed to have a double-layer structure.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of manufacturing a blow-molded panel, comprising steps of:

(a) heating a first polymer and a second polymer until said first and second polymers are in a fluid state;

(b) extruding said first and second polymers to form first and second polymer layers respectively;

(c) fusing said first and second polymer layers with each other in an overlapping manner to form a fused body;

(c) blow molding said fused body to form first and second panel members which are spaced apart with each other to form a cavity between said first and second panel members, wherein each of said first and second panel members is constructed by said first and second polymer layers;

(d) forming a plurality of supporting structures by concurrently stretching and recessing a plurality of different portions of said first polymer layer and a plurality of different portions of said second polymer layer of said second panel member into said cavity for ensuring no additional material of said second panel member being added to form said supporting structures, wherein said supporting structures are extended to bias against said first panel member so as to support said first panel member;

(e) heating a third polymer until said third polymer is in a fluid state;

(f) extruding said third polymer to form a third polymer layer, wherein said first, second and third polymers are extruded to form said first, second and third polymer layers at the same time; and (g) fusing said first, second and third polymer layers with each other in an overlapping manner to form said fused body at a position that said second polymer layer is sandwiched between said first polymer layer and said third polymer layer, wherein each of said first and second panel members is constructed by said first, second and third polymer layers, wherein a plurality of different portions of said third polymer layer of said second panel member are concurrently stretched and recessed along with said portions of said first polymer layer and said portions of said second polymer layer of said second panel member into said cavity to form said supporting structures respectively, such that each of said supporting structures is constructed by said first, second and third polymer layers, wherein said fused body is blow-molded to form said first and second panel members at a position that said cavity is formed between said third polymer layer of said first panel member and said third polymer layer of said second panel member, wherein said first polymer layer is made of high density polyethylene, said third polymer layer is made of a mixture of high density polyethylene and calcium carbonate or a mixture of high density polyethylene and glass fiber, and said second polymer layer is made of a mixture of metallocene polyethylene and calcium carbonate or a mixture of metallocene polyethylene plus glass fiber.

2. The method, as recited in claim 1, wherein said first polymer layer of each of said first panel member and said second panel member is embodied as an outer layer being made of materials with high surface strength, scratch resistance, and oil resistance, said third polymer layer of each of said first panel member and said second panel member is embodied as an inner layer being made of materials with low thermoplastic shrinkage ratio to provide frame support, said second polymer layer of each of said first panel member and said second panel member is embodied as an intermediate layer being made of elasticity and energy absorption material to provide a buffering effect for said first and third polymer layers.

3. The method, as recited in claim 1, wherein the step (d) further comprises a step of:
(d.1) fusing said supporting structures with said first panel member.

4. The method, as recited in claim 1, wherein, in the step (d), wherein a top of each of said supporting structures has a U-shaped waving structure to form two or more peak points biasing against said first panel member.

5. The method, as recited in claim 4, wherein the step (d) further comprises a step of:
(d.1) fusing said peak points of each of said supporting structures with said first panel member.

6. The method, as recited in claim 5, wherein the step (d) further comprises a step of:
(d.2) integrally forming a plurality of reinforcing ribs with said supporting structures at a position that said reinforcing rib is located between said peak points.

7. The method as recited in claim 1 wherein, in the step (d), wherein said supporting structures are arranged in an interval manner and in a staggered manner.

8. The method as recited in claim 1 wherein, in the step (a), wherein a heating temperature of each of the first polymer and the second polymer has a range from 160° C. to 180° C.

9. The method, as recited in claim 1, wherein the second polymer is made of recycled plastic.

10. The method, as recited in claim 1, wherein the second polymer layer is embodied as a foam layer.

11. The method, as recited in claim 1, wherein a thickness of each of the said polymer layer and said second polymer layer has a range from 0.1 mm to 5 mm.

12. The method, as recited in claim 1, wherein a thickness of said blow-molded panel has a range from 40 mm to 60 mm.

* * * * *